(12) United States Patent
Martin et al.

(10) Patent No.: US 9,178,338 B2
(45) Date of Patent: Nov. 3, 2015

(54) ANGULAR ADJUSTABLE REAR STUD FOR MOLDED CASE CIRCUIT BREAKER

(71) Applicant: Siemens Aktiengesellschaft, Munich (DE)

(72) Inventors: Tom J. Martin, Suwanee, GA (US); Charles W. Stanford, Bellefontaine, OH (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/302,501

(22) Filed: Jun. 12, 2014

(65) Prior Publication Data

US 2015/0053452 A1     Feb. 26, 2015

Related U.S. Application Data

(60) Provisional application No. 61/868,109, filed on Aug. 21, 2013.

(30) Foreign Application Priority Data

Apr. 30, 2014     (EP) .................................... 14166597

(51) Int. Cl.
  *H02B 1/46*     (2006.01)
  *H01H 11/00*     (2006.01)
  *H01H 71/08*     (2006.01)
(52) U.S. Cl.
  CPC ............. *H02B 1/46* (2013.01); *H01H 11/0031* (2013.01); *H01H 71/08* (2013.01)
(58) Field of Classification Search
  CPC ....... H02B 1/46; H01H 71/08; H01H 11/0031
  USPC .............. 174/59; 361/631; 439/814; 335/202
  See application file for complete search history.

(56) References Cited

U.S. PATENT DOCUMENTS 3,287,534 A    11/1966   Cellerini et al.
6,255,927 B1 *  7/2001   Fischer et al. ................ 335/202
(Continued)

FOREIGN PATENT DOCUMENTS

CN       103177908 A    6/2013
DE       10311901 A1    6/2004
(Continued)

OTHER PUBLICATIONS

Extended European Search Report dated Jan. 12, 2015 and issued in Application No. 14166597.6.

*Primary Examiner* — Dhirubhai R Patel
(74) *Attorney, Agent, or Firm* — Harness, Dickey & Pierce, P.L.C.

(57) ABSTRACT

An adjustable rear stud connector is suitable for connecting a circuit breaker to a bus bar. Rear stud connectors are rotationally adjustable to contact a corresponding bus bar, while minimizing the stress applied to the rear stud connector when connected. The rear stud connector includes a rear stud, including a stud blade and a stud base, and a rear stud adapter including an adapter base and an adapter mount. The adapter base includes a plurality of connector holes for connecting the stud base to the adapter base with fasteners. The stud base includes a plurality of circumferentially extending slots, with reference to a center axis of the stud base, for connecting the stud base to the adapter base with fasteners and to allow for a degree of positional flexibility of the stud base relative to the adapter base in a circumferential direction with respect to the center axis.

25 Claims, 7 Drawing Sheets

(56) References Cited

U.S. PATENT DOCUMENTS

| | | | |
|---|---|---|---|
| 7,619,902 B2 * | 11/2009 | Buchbender et al. | 361/833 |
| 8,425,264 B2 * | 4/2013 | Michell et al. | 439/789 |
| 2008/0237001 A1 | 10/2008 | Gottschalk et al. | |

FOREIGN PATENT DOCUMENTS

| | | |
|---|---|---|
| EP | 1164614 A2 | 12/2001 |
| EP | 2296158 A1 | 3/2011 |

* cited by examiner

FIG 7
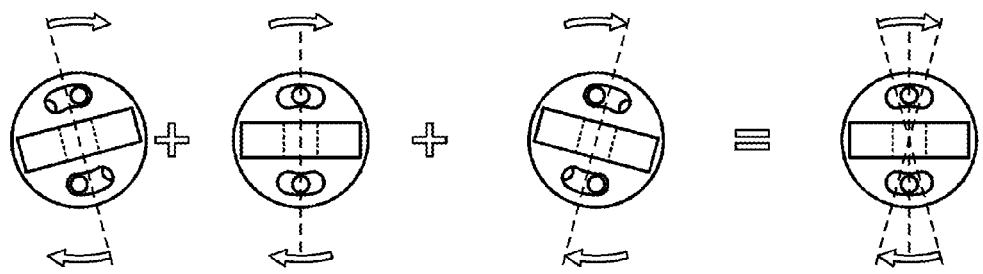
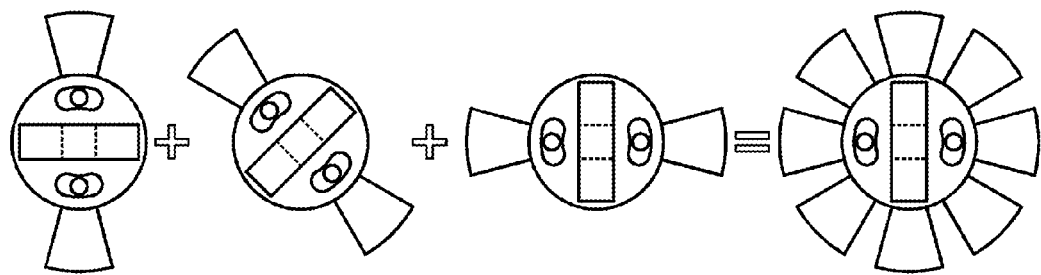
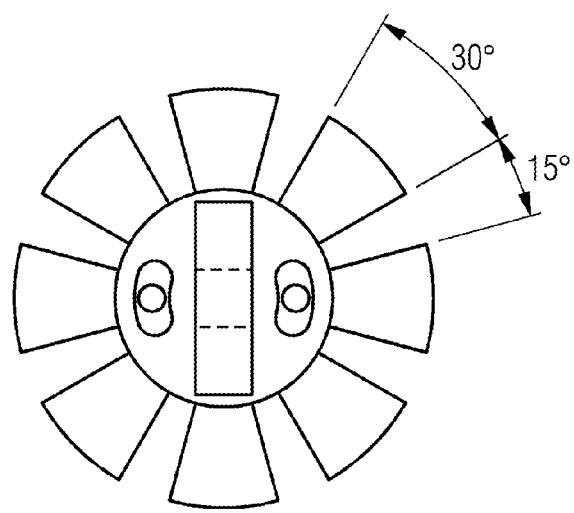

ANGULAR ADJUSTABLE REAR STUD FOR MOLDED CASE CIRCUIT BREAKER

PRIORITY STATEMENT

The present application hereby claims priority under 35 U.S.C. §119 to European patent application number EP 14166597.6 filed Apr. 30, 2014 and to U.S. Provisional patent application US 61/868,109 filed Aug. 21, 2013, the entire contents of each of which are hereby incorporated herein by reference.

FIELD

At least one embodiment of the present invention generally relates to adjustable rear stud connectors that are suitable for connecting a circuit breaker to a bus bar. In particular, at least one embodiment of the present invention relates to adjustable rear stud connectors that are rotationally adjustable to contact a corresponding bus bar, while minimizing the stress applied to the rear stud connector when connected to the bus bar.

BACKGROUND

In today's market, molded case circuit breakers (MCCB's) are often connected to a bus bar of an electrical appliance by way of a circuit breaker rear stud connector, like large copper and/or aluminum bussing connectors or large cables.

Conventional circuit breaker rear stud connectors have the disadvantage that a connection between the bus bar and rear connector of a circuit breaker is often stressed due to a misalignment of the contact surfaces of the bus bar and the rear connector. If the contact surfaces are not aligned so as to be in the same or parallel planes, the use of fasteners to connect or secure the contact surfaces may add a stress on the rear connector and/or bus bar. These connections can cause high stress and/or strain forces if the contact surfaces are not in alignment with the plane of the connection surface. These forces can cause undue stress/strain to the circuit breaker and as circuit breakers become smaller, as today's market dictates, structural integrity becomes a concern. In the past Siemens, as well as some competitors, have offered adjustability of rear studs in 90 degree increments often making it difficult to make a secure connection without imposing unwanted forces to the device.

SUMMARY

At least one embodiment of the present invention provides a rear stud connector that does not show the problem discussed above. In particular, at least one embodiment of the present invention provides a rear stud connector that has an increased flexibility of being used in a broader field of applications and causes less stress or strain forces than conventional circuit breaker rear stud connectors while being connected to a bus bar.

A circuit breaker rear stud connector is disclosed. Further details of the invention unfold from the dependent claims as well as the description and the drawings.

A circuit breaker rear stud connector according to at least one embodiment of the invention comprises a rear stud and a rear stud adapter. The rear stud comprises a stud blade and a stud base. The rear stud adapter comprises an adapter base and an adapter mount. The adapter base comprises a plurality of connector holes for connecting the stud base to the adapter base with fasteners. Moreover, the stud base comprises a plurality of circumferentially extending slots with reference to a center axis of the stud base for connecting the stud base to the adapter base with fasteners and to allow for a degree of positional flexibility of the stud base relatively to the adapter base in a circumferential direction with respect to the center axis.

BRIEF DESCRIPTION OF THE DRAWINGS

Further advantages, features and details of the invention unfold from the following description, in which by reference to drawings working examples of the present invention are described in detail. Thereby, the features from the claims as well as the features mentioned in the description can be essential for the invention as taken alone or in an arbitrary combination. In the drawings:

FIG. 7 shows a schematic top view of adjustment possibilities of a circuit breaker rear stud connector according to an embodiment of the invention.

DETAILED DESCRIPTION OF THE EXAMPLE EMBODIMENTS

Figure 1:
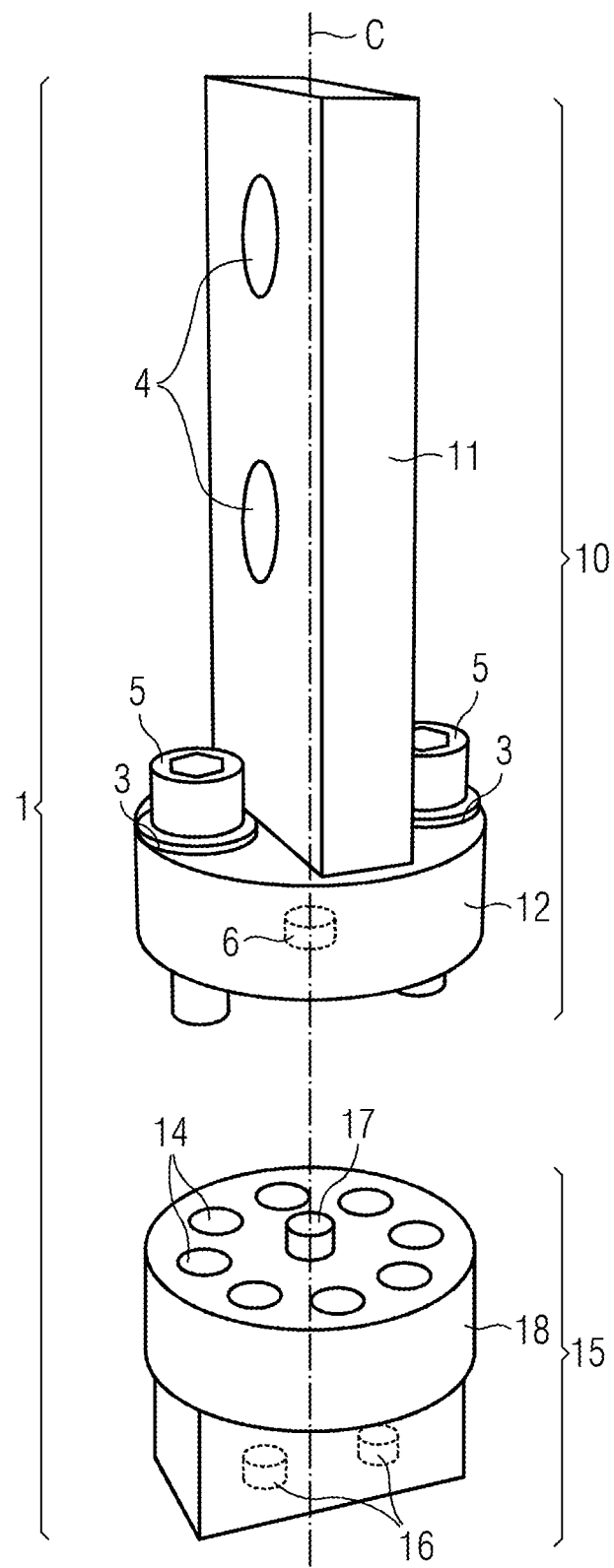
FIG. 1 shows a perspective, schematic side view of an unassembled circuit breaker rear stud connector according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should riot be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is riot intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

A circuit breaker rear stud connector according to at least one embodiment of the invention comprises a rear stud and a rear stud adapter. The rear stud comprises a stud blade and a stud base. The rear stud adapter comprises an adapter base and an adapter mount. The adapter base comprises a plurality of connector holes for connecting the stud base to the adapter base with fasteners. Moreover, the stud base comprises a plurality of circumferentially extending slots with reference to a center axis of the stud base for connecting the stud base to the adapter base with fasteners and to allow for a degree of positional flexibility of the stud base relatively to the adapter base in a circumferential direction with respect to the center axis.

A circuit breaker rear stud connector according to at least one embodiment of the invention has the advantage that by allowing the rear stud connector to adjust to the plane of the bussing and adjust to the most stress free orientation with respect to the bus bar, the lateral forces applied to the circuit breaker are greatly reduced. Moreover, at least one embodiment of the invention offers a much broader range of adjustment to allow the alignment of the rear stud connector to rigid bussing or large cables. At least one embodiment of the invention allows for better alignment of the bus bar and rear stud connector so as to provide for more accurate alignment as well as allows ease of attachment while reducing static forces on the circuit breaker.

Advantageously, the adapter base has at least eight connector holes that are evenly distributed at the adapter base in circumferential direction with respect to the center axis. Thus, center points of the connector holes are located on a circle around the center axis of the rear stud. The distance of two adjacent connector holes is 45 degrees with respect to the center axis.

In a preferred embodiment of the invention, the slots extend over a distance of 30 degrees with respect to the center axis. Hence, when the rear stud and the rear stud adapter are being assembled with each other and the screws are not tightened, the rear stud can be rotated relatively to the rear stud adapter by 30 degrees. This range of adjustment allows for a comfortable alignment of the contact surfaces a rear connector and a bus bar without the necessity of disassembling the rear stud from the rear stud adapter.

It is preferred that the rear stud adapter comprises a pin and the stud base comprises a respective cavity, wherein the pin is configured to be close-fittingly received within a cavity when the rear stud is arranged on the rear stud adapter. Thus, the rear stud is rotatably fixable onto the rear stud adapter by a pin-cavity-connection. This feature has the advantage that an alignment process of a rear stud to a bus bar can be performed after the rear stud is arranged on the rear stud adapter and the screws are not tightened. Moreover, since the pin prevents a relative translational movement of the rear stud to the rear stud adapter, the alignment process is facilitated.

Furthermore, it is preferred that the pin and the cavity have a circular cross-section. This feature ensures a smooth relative rotation of the rear stud and the rear stud adapter.

More preferred the pin and the cavity have a substantially cylindrical shape. By this, the alignment process is facilitated because the pin-cavity-connection will stay closely engaged even in case of a small relative translational movement of the rear stud and the rear stud adapter along the center axis. By partly tightening the screws before such alignment procedure, such translational movement can be reduced in a way that the pin-cavity-connection cannot disengage.

In a preferred embodiment of the invention, the rear stud base and the adapter base have a substantially cylindrical shape. Thus, no items can be trapped between the rear stud base and the adapter base during an adjustment procedure.

Figure 5:
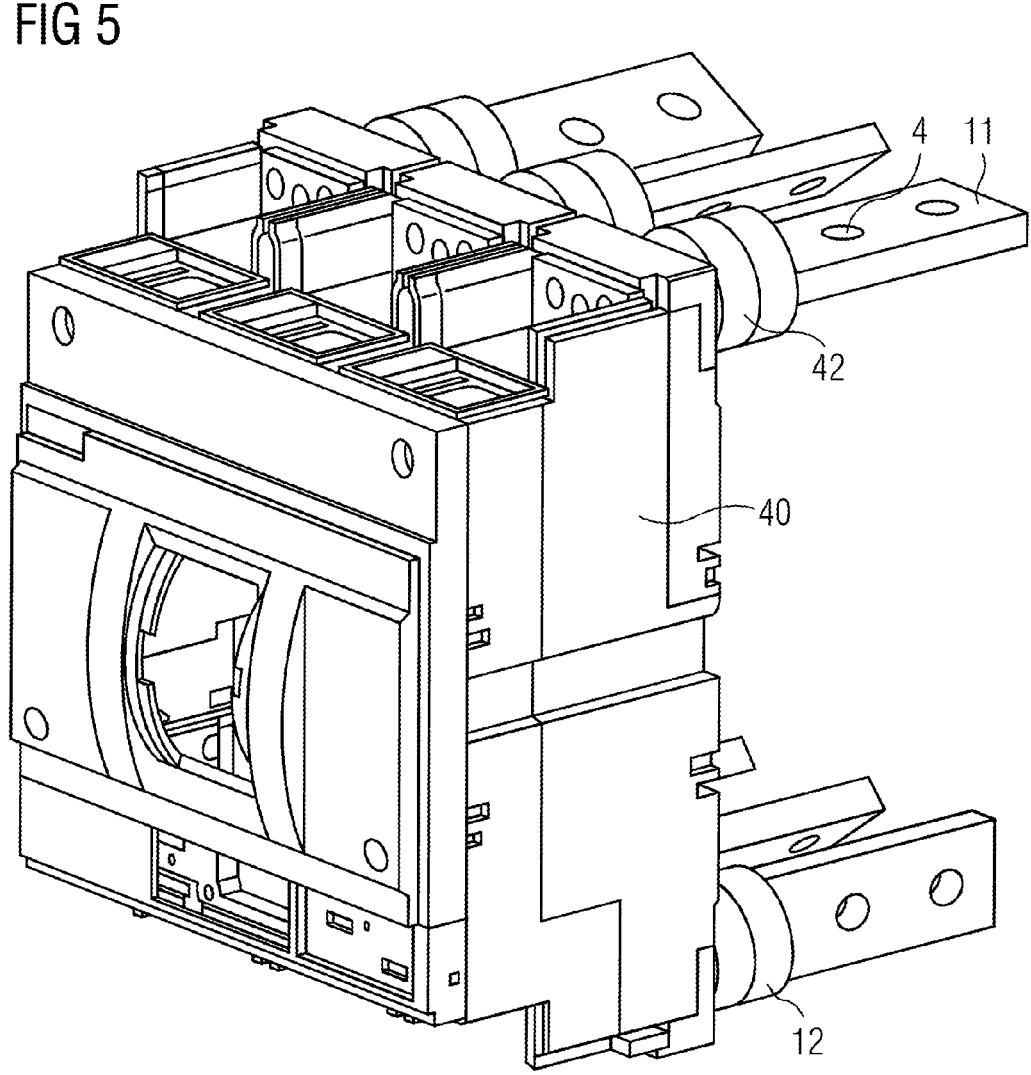
FIG. 5 shows a perspective side view of the circuit breaker of FIG. 4.

Shown in FIG. 1 are the components of an embodiment of the present invention. The rear stud connector 1 is comprised of a rear stud 10 and a rear stud adapter 15. The rear stud adapter 15 comprises an adapter mount 17 and an adapter base 18. The rear stud adapter 15 may be made as a one piece or alternatively as a two piece design connectable during assembly. The rear stud adapter 15 has one or more connection holes 14 to connect to a circuit breaker 40 via a fastener such as a screw. As best shown in FIG. 5, the adapter mount 17 is connected to a housing of the circuit breaker 40 by fastening the adapter mount 17 of the rear stud connector 15 to the circuit breaker 40, by use of a screw or other fastening means. Note: the adapter mount 17 may be connected to the adapter base 18 by the same screw which is used to connect the adapter mount 17 to the circuit breaker 40.

The adapter base 18 comprises a plurality of connection holes 14 spaced apart at strategic positions to allow for a greater degree of orientation freedom of the rear stud 10 relative to the rear stud adapter 15. In the present embodiment the center of each connection hole 14 is placed at a radial distance of 45 degrees with respect to a center axis (C) of rear stud adapter 15 so as to allow for the use of eight equidistant connection holes 14. Although in this embodiment, eight holes have been used, the present invention may use, if useful, any number of connection holes 14 as well as any position of the connection holes 14 to accommodate the desired orientation of the stud blade 11.

To better align the rear stud adapter 15 to the rear stud 10, a projection pin 7 at substantially the center of the adapter base 18 is used to mate with a cavity 6 in an underside of the stud base 12. The projection pin 7 and the cavity 6 are used for ease of alignment, but are not necessarily needed for this invention. The rear stud 10 is comprised of a stud base 12 and a stud blade 11. The rear stud 10 may be made as a one piece or two piece component. The stud base 12 comprises a plurality of slots 3 larger than the diameter of a shaft of a screw 5 so as to allow the screw 5 to be positioned at any point within that particular slot. The slots 3 may be shaped in whatever fashion is most appropriate under a given design, however, in the present embodiment, the slots 3 are preferably designed in a kidney shape so as to allow the stud base 12 to freely move radially past the loosened screws 5.

The rear stud 10 preferably comprises of a plurality of holes 4 to allow for fastening the stud blade 11 to a bus bar by at least one conventional fastening device(s). Typically, the stud blade 11 and the bus bar are fastened together by bolts and nuts, but may be fastened by other device(s). The rear stud connector 1 may be made of any conductive material suitable for the transmission of current. Copper, aluminum or any electrically conductive materials may be used.

Figure 2:
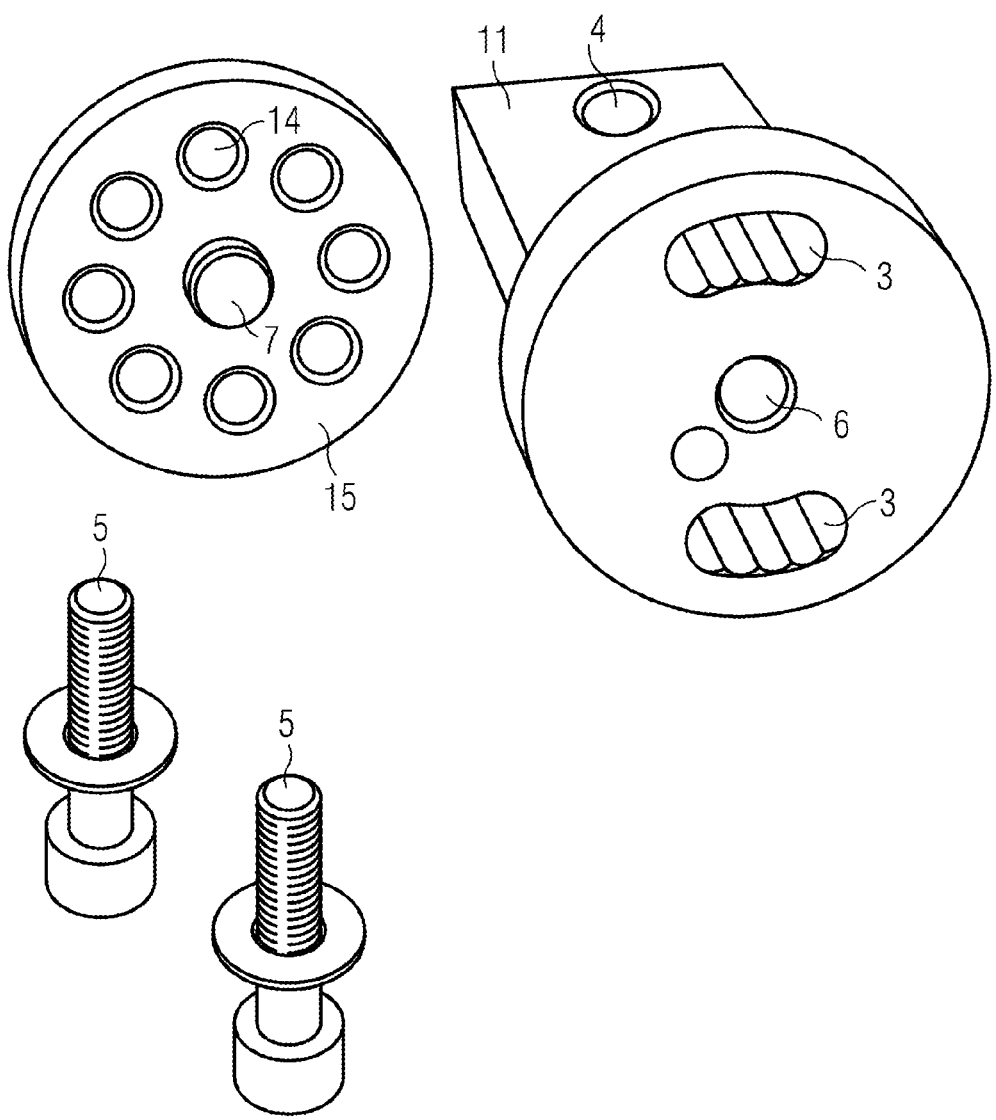
FIG. 2 shows a perspective, schematic view of the main components of the circuit breaker rear stud connector of FIG. 1.

FIG. 2 is a perspective, schematic view of the main components of the circuit breaker rear stud connector 1 of FIG. 1. The screws 5 are placed vertically through the slots 3 so as to mate with the holes 14 in the adapter base 18. By using the appropriate connection hole 14 of the adapter base 18, the orientation of the stud blade 11 may be positioned in the most advantageous way to minimize stress or strain forces when the stud blade 11 is fastened to the bus bar.

Figure 3:
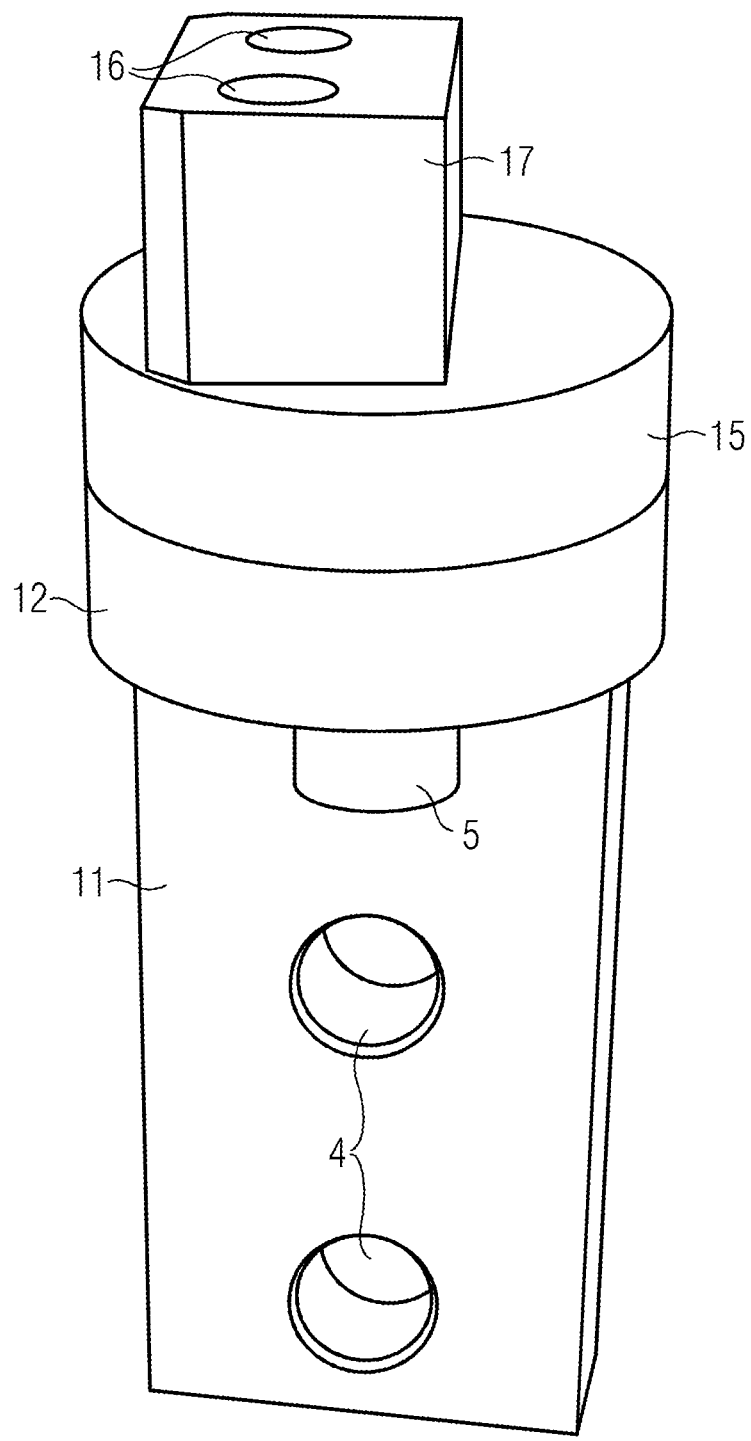
FIG. 3 shows a perspective, schematic side view of the circuit breaker rear stud connector of FIG. 1 in an assembled state.

FIG. 3 is a perspective, schematic side view of the circuit breaker rear stud connector 1 of FIG. 1 in an assembled state. In this figure it is noticeable that the adapter mount 17 is offset from the center of the adapter base 18. This is an optional feature of the present embodiment, but in not a requirement for the invention. The purpose of this offset is for ideal rear stud 10 placement relative to the circuit breaker 40.

Figure 4:
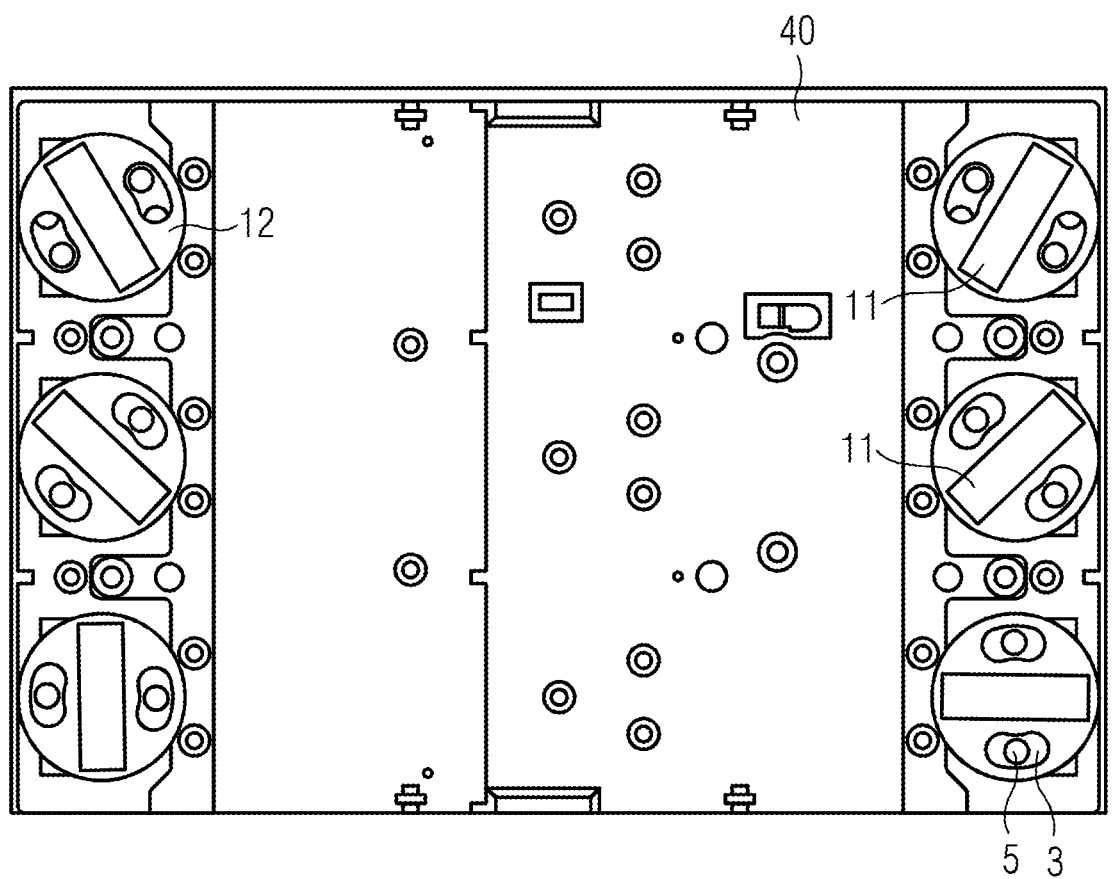
FIG. 4 shows a rear view of a circuit breaker comprising six circuit breaker rear stud connectors according to an embodiment of the invention.

FIG. 4 is a rear view of a circuit breaker 40 comprising six circuit breaker rear stud connectors 1 according to an embodiment of the invention. The circuit breaker 40 shows a three pole, three phase circuit breaker 40 in which the stud blades 11 are at various orientations to demonstrate the flexibility in orientation of the stud blade 11. The heads of the screws 5 have been removed for better clarity of the position of the shafts of the screw 5 within the slots 3 of the stud base 12.

FIG. 5 is a perspective side view of the circuit breaker 40 of FIG. 4. As already discussed with respect to FIG. 4, the stud blades 11 are oriented at various positions to accommodate the orientation of the corresponding bus bars. Around the adapter base 18 and adapter mount 17, insulation may be used to minimize electrical conductivity between rear stud connectors 1.

Figure 6:
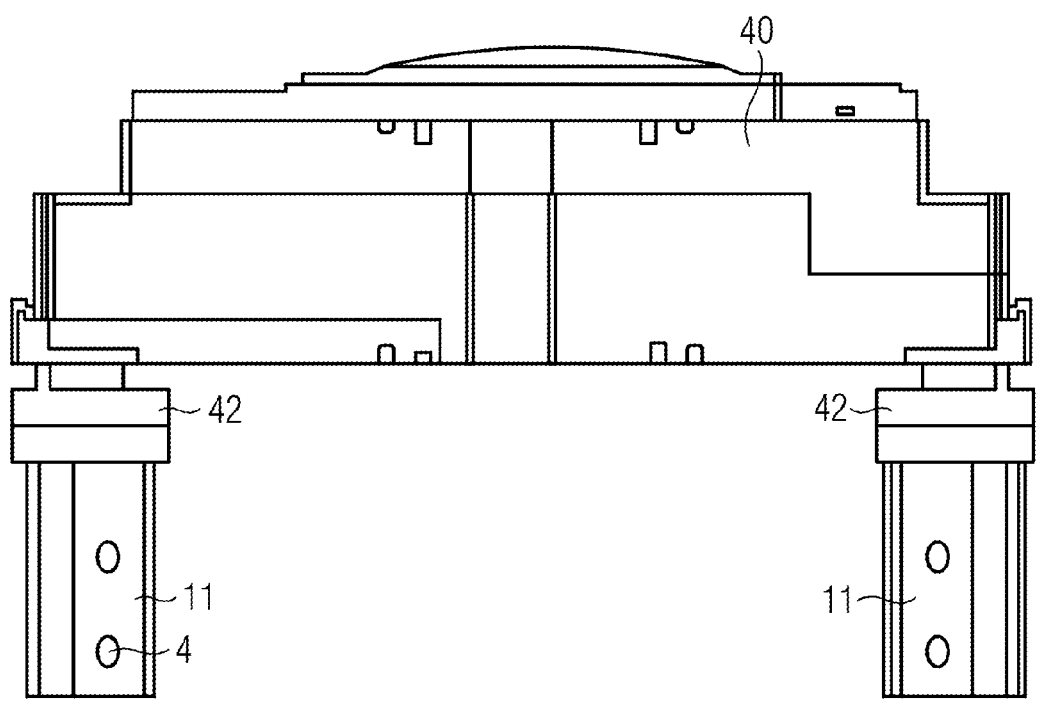
FIG. 6 shows a side view of the circuit breaker of FIG. 4 and FIG. 5.

FIG. 6 is a side view of the circuit breaker 40 with rear stud connectors 1 in the orientation of FIGS. 4 and 5.

FIG. 7 shows a schematic top view of adjustment possibilities of a circuit breaker rear stud connector according to an embodiment of the invention. In other words, FIG. 7 diagrams the rotational adjustment available for the current embodiment at the rear stud blade 11. In this example, the rear stud 10 has a rotational range of thirty degrees about any adapter base hole. Consequently, between each two adjacent connection holes 14 there is a fifteen degree range that is unachievable for a relative orientation of the stud blade 11 to the adapter base 18.

The previous annotation of the circuit breaker rear stud connector describes an embodiment of the present invention by way of an example, only. However, the described example is riot limiting the scope of the present invention to the features as illustrated in this example.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Although the invention has been illustrated and described in detail on the basis of the preferred example embodiment, the invention is not limited by the disclosed examples and other variations can be derived herefrom by the person skilled in the art, without departing from the scope of protection of the invention.

REFERENCE SIGNS

1 Rear Stud Connector
3 Slot
4 Hole
5 Screw
6 Cavity
7 Pin
10 Rear Stud
11 Stud Blade
12 Stud Base
14 Connection Hole
15 Rear Stud Adapter
16 Mount Hole
17 Adapter Mount
18 Adapter Base
40 Circuit Breaker
42 Insulation

What is claimed is:

1. A circuit breaker rear stud connector, comprising:
   a rear stud including
      a stud blade and
      a stud base having a cavity; and
   a rear stud adapter including
      an adapter base having a projection pin to be received in the cavity to connect the stud base, and an adapter mount, the adapter base including a plurality of connection holes for connecting the stud base to the adapter base with fasteners, and the stud base including a plurality of circumferentially extending slots, with reference to a center axis of the stud base, to connect the stud base to the adapter base with fasteners and to allow for a degree of positional flexibility of the stud base relative to the adapter base in a circumferential direction with respect to the center axis.

2. The circuit breaker rear stud connector of claim 1, wherein the adapter base includes at least eight connection holes, and wherein the connection holes are evenly distributed at the adapter base in circumferential direction with respect to the center axis.

3. The circuit breaker rear stud connector of claim 2, wherein the slots extend over a distance of 30 degrees with respect to the center axis.

4. The circuit breaker rear stud connector of claim 2, wherein the pin is configured to be close-fittingly received within the cavity when the rear stud is arranged on the rear stud adapter.

5. The circuit breaker rear stud connector of claim 4, wherein the pin and the cavity include a circular cross-section.

6. The circuit breaker rear stud connector of claim 5, wherein the pin and the cavity include a substantially cylindrical shape.

7. The circuit breaker rear stud connector of claim 2, wherein the rear stud base and the adapter base include a substantially cylindrical shape.

8. The circuit breaker rear stud connector of claim 1, wherein the slots extend over a distance of 30 degrees with respect to the center axis.

9. The circuit breaker rear stud connector of claim 8, wherein the pin is configured to be close-fittingly received within the cavity when the rear stud is arranged on the rear stud adapter.

10. The circuit breaker rear stud connector of claim 9, wherein the pin and the cavity include a circular cross-section.

11. The circuit breaker rear stud connector of claim 10, wherein the pin and the cavity include a substantially cylindrical shape.

12. The circuit breaker rear stud connector of claim 8, wherein the rear stud base and the adapter base include a substantially cylindrical shape.

13. The circuit breaker rear stud connector of claim 1, wherein the pin is configured to be close-fittingly received within the cavity when the rear stud is arranged on the rear stud adapter.

14. The circuit breaker rear stud connector of claim 13, wherein the pin and the cavity include a circular cross-section.

15. The circuit breaker rear stud connector of claim 14, wherein the pin and the cavity include a substantially cylindrical shape.

16. The circuit breaker rear stud connector of claim 13, wherein the rear stud base and the adapter base include a substantially cylindrical shape.

17. The circuit breaker rear stud connector of claim 1, wherein the rear stud base and the adapter base include a substantially cylindrical shape.

18. The circuit breaker rear stud connector of claim 1, wherein the stud base and stud blade are formed as a one piece component.

19. The circuit breaker rear stud connector of claim 18, wherein the adapter mount is connectable to the adapter base via a fastener.

20. The circuit breaker rear stud connector of claim 19, wherein the fastener is a screw.

21. The circuit breaker rear stud connector of claim 1, wherein the stud base and stud blade are formed as two separate connectable components.

22. The circuit breaker rear stud connector of claim 21, wherein the adapter mount is connectable to the adapter base via a fastener.

23. The circuit breaker rear stud connector of claim 22, wherein the fastener is a screw.

24. The circuit breaker rear stud connector of claim 1, wherein the adapter mount is connectable to the adapter base via a fastener.

25. The circuit breaker rear stud connector of claim 24, wherein the fastener is a screw.

* * * * *